April 30, 1957 P. A. HORTON 2,790,368
HOE WEEDER
Filed Sept. 28, 1953

Perry A. Horton
INVENTOR.

United States Patent Office 2,790,368
Patented Apr. 30, 1957

2,790,368

HOE WEEDER

Perry A. Horton, St. Helens, Ore.

Application September 28, 1953, Serial No. 382,567

1 Claim. (Cl. 97—63)

This invention relates to a hoe weeder, and more specifically provides a hand operated hoe weeder for use in gardens, flower beds, or the like.

An object of this invention is to provide a hoe weeder having a horizontally disposed ground agitating member for cultivating the coil.

Another object of this invention is to provide a hoe weeder that is pushed and pulled along the surface of the ground.

A further object of this invention is to provide a hoe weeder having the soil penetrating means made of a wire cutting blade of arcuate form wherein the cutting edge is at an angle to the longitudinal axis of the hoe.

Yet another object of this invention is to provide a hoe weeder which is simple in construction, easy and efficient in manipulation and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3, 4:
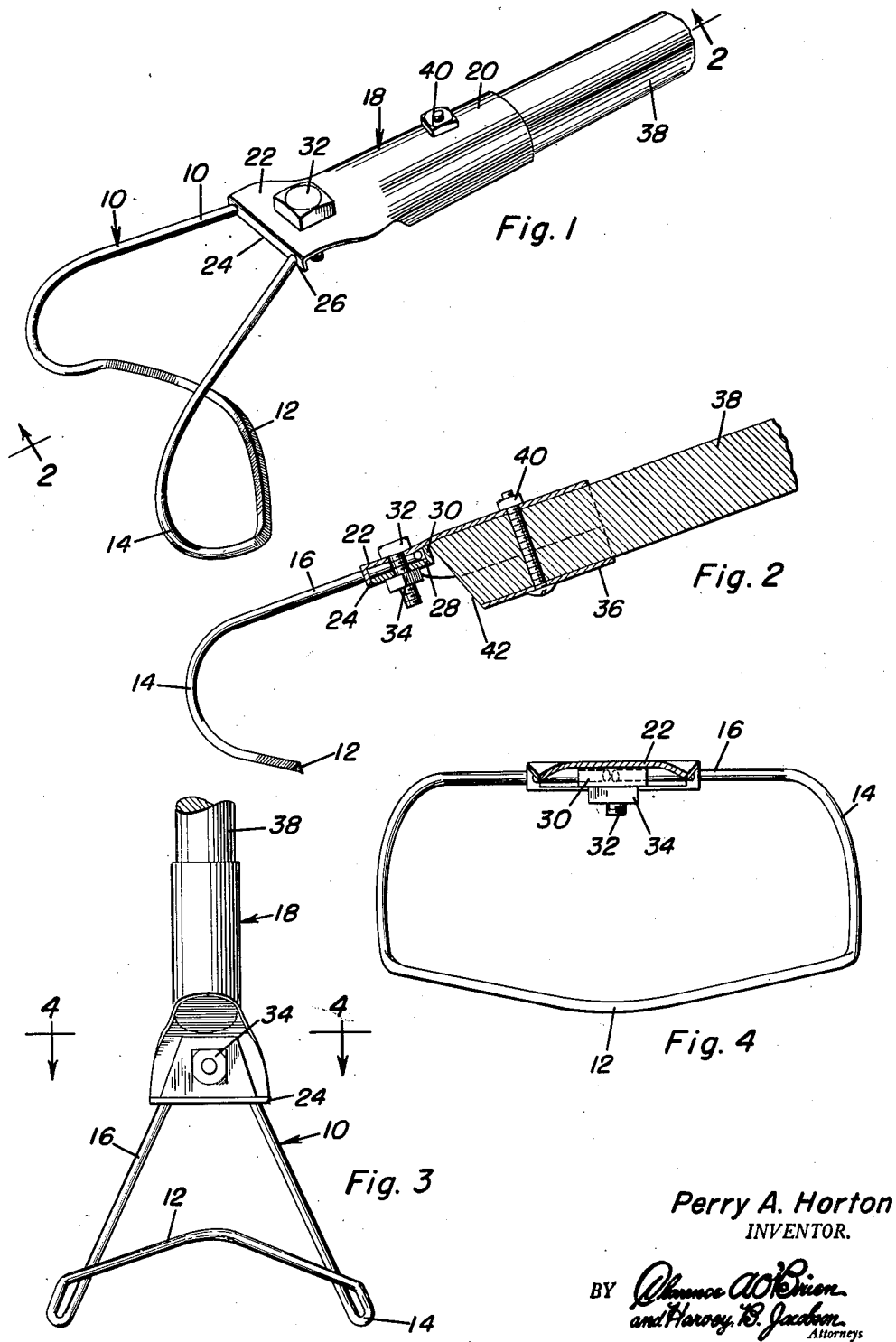
Figure 1 is a perspective view of the hoe weeder of this invention.
Figure 2 is a longitudinal, vertical section taken substantially along section line 2—2 of Figure 1 showing details of the hoe attaching means.
Figure 3 is a bottom plan view showing the relationship of the hoe and handle.
Figure 4 is a transverse vertical section taken substantially along section line 4—4 of Figure 3, showing details of the hoe mounting means.

Referring now more specifically to the drawings, it will be seen that the numeral 10 generally designates the blade of the hoe weeder of this invention, having a flat center portion 12 ground into a substantially triangular cross section and bent into an arc and having return bend portions 14 spaced from and passing over the portion 12 and having converging horizontal portion 16 for attaching to a two-piece bracket 18. The bracket 18 includes an upper section 20 having a flat end portion 22 with a down turned flange 24 thereon and having notches 26 receiving the portion 16 of the blade member 10. A right angle clamp member 28 is positioned over the free end of the portion 16 with the short flange 30 of the right angle member engaging the under surface of the upper clamp member 20. A bolt 32 having a nut 34 thereon is positioned through the flat portion 22 and the clamp member 28 for attaching the blade member 10 to the bracket 18. A lower handle clamping member 36 surrounds the end of the handle 38 and a suitable bolt and nut fastener 40 passes through both sections of the bracket 18 and the handle 38 thereby securing the bracket 18 to the handle. It will be noted that the lower end of the handle 38 and the bracket member 18 are provided with an inclined surface 42 thereby forming a flush end portion.

The operation of the device will be readily understood. The gardener grasps the handle 38 in an obvious manner and engages the sharpened portion 12 of the blade 10 and reciprocates the blade 12 over the ground thereby agitating the ground and cutting off any weeds that may be growing. The sharpened portion 12 is formed arcuately so that the sharp edges may engage the weeds at an angle thereby more effectively chopping the weeds out. Obviously, the blade may be pushed downwardly under the surface of the ground, as desired, depending upon the condition of the ground and the desired amount of cultivation. Obviously, the bent portion 14 may be used as runners or guides for manipulating the cutting portion 12 and due to the particular curvature of the blade member 10 the runners may be used to dip the cutting blade in and out of the ground as desired. The device may be disassembled for replacing the handle or replacing the blade member 10 in an obvious manner by the use of a suitable wrench. The blade member 10 is made from one continuous piece of heavy round high carbon, oil tempered spring steel wire, however, other materials may be used in this device as may become available.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A hoe weeder comprising a handle member, a soil agitating member of substantially circular cross sectional shape, means detachably securing said soil agitating member to said handle, said soil agitating member comprising a substantially U-shaped member having a sharpened bight portion sharpened to a substantially triangular cross sectional shape forming opposed cutting edges, said U-shaped member having converging legs, said legs having return bends extending rearwardly spacing said legs from said bight portion, said means including a clamp member engaging said converging legs at the rearmost portions thereof, said bight portion having angulated sections and having an apex at the center of said bight portion rearwardly disposed with respect to the angulated sections of said bight portion.

References Cited in the file of this patent

UNITED STATES PATENTS

| 664,601 | Anderson | Dec. 25, 1900 |
| 1,600,858 | Wright | Sept. 21, 1926 |
| 1,639,643 | Arvedson | Aug. 23, 1927 |
| 2,237,988 | Halvorsen | Apr. 8, 1941 |

FOREIGN PATENTS

| 761,305 | France | Jan. 3, 1934 |
| 925,459 | France | Mar. 31, 1947 |